Jan. 29, 1924.
T. J. McGILL
1,481,919
ELECTRIC POWER SYSTEM
Filed May 17, 1920
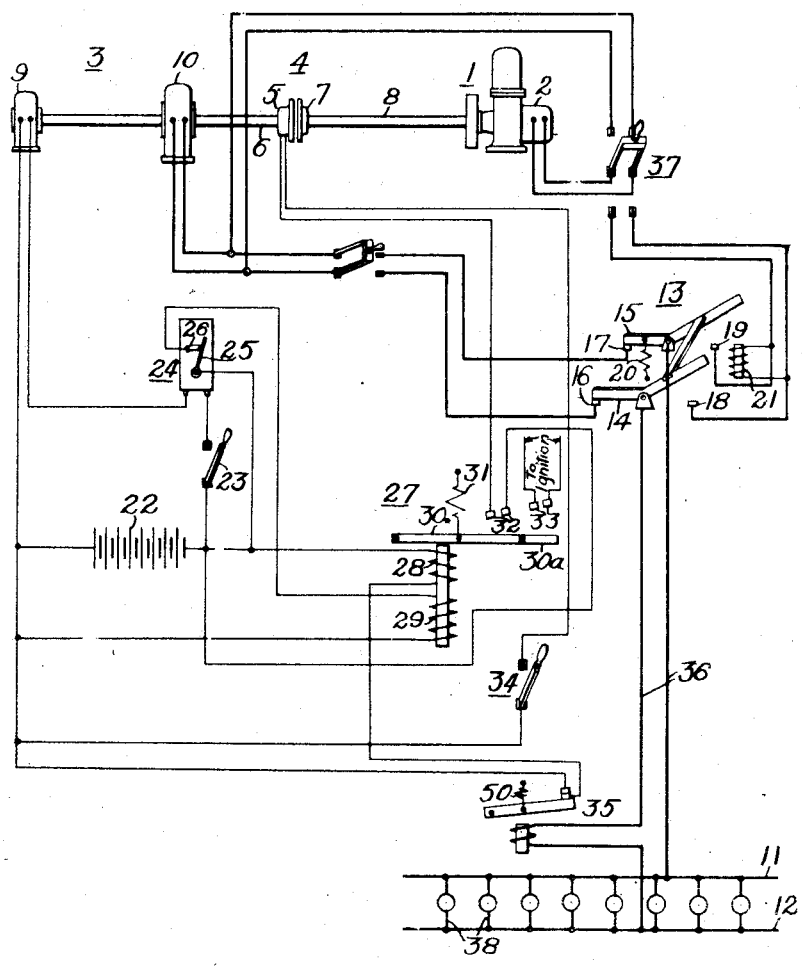
WITNESSES:
J. A. Helsel.
W. B. Wells.
INVENTOR
Thomas J. McGill.
BY
Wesley G. Carr
ATTORNEY Patented Jan. 29, 1924.

1,481,919

UNITED STATES PATENT OFFICE.

THOMAS J. McGILL, OF CHICAGO, ILLINOIS, ASSIGNOR TO WESTINGHOUSE ELECTRIC & MANUFACTURING COMPANY, A CORPORATION OF PENNSYLVANIA.

ELECTRIC POWER SYSTEM.

Application filed May 17, 1920. Serial No. 382,168.

*To all whom it may concern:*

Be it known that I, THOMAS J. McGILL, a citizen of the United States, and a resident of Chicago, in the county of Cook and State of Illinois, have invented a new and useful Improvement in Electric Power Systems, of which the following is a specification.

My invention relates to electric systems and, particularly, to systems for controlling small electric generating plants.

One object of my invention is to provide an electrical system that shall embody low-voltage operated means for supplying current of a higher voltage to a line circuit under certain load conditions and that shall also embody means, operative under other load conditions, for starting an engine having a main generator connected to it for supplying energy to the line circuit.

In operating small power plants, such, for example, as so-called farm lighting systems, it has been generally customary, heretofore, to generate a relatively low-voltage current, preferably 32 volts. Power plants generating such low-voltage current have been practically universally adopted in order to permit connection of the storage battery, which is used to start the engine, directly to the line circuit at certain times. Thus, in a farm lighting system, it is very desirable to operate the engine for supplying current to the line circuit during the day and to connect the battery directly to the line circuit during the night.

Such systems are objectionable in that the various translating devices which are connected to the line circuit cannot be used on a lighting circuit of standard voltage. Inasmuch as the number of so-called "farm lines" is increasing throughout the country and will continue to increase in the future, it is often advisable to install a plant of the higher-voltage type in case a standard-voltage supply line may be available in the future. Moreover, in case the line circuit, which is connected to the power plant, is extended for any great distance, the distributing costs render it desirable to operate the plant at the higher voltage. The cost and size of a battery which would produce a standard voltage prohibits its use for starting the engine of a small power plant and for supplying current at night.

In a system constructed in accordance with my invention, a low-voltage battery is used for operating a dynamo-electric machine, which not only serves to start the engine for operating the main generator but also to supply current to the line circuit when the engine is not operating.

Preferably, in practising my invention, a motor-generator set is provided for starting the engine and for supplying current to the line circuit during the night. It is to be understood, however, that any equivalent dynamo-electric machine, such, for example, as a rotary converter may be utilized for such purpose, if so desired. A low-voltage battery is provided for operating a motor-generator set and a clutch, preferably an electromagnetic clutch, is provided for connecting the motor-generator set, under certain conditions, to the engine for operating a main generator.

Normally, the generator of the motor-generator set is directly connected to the line circuit, and an electro-magnetic device is provided for energizing the magnetic clutch in case the load upon the line circuit is raised above a predetermined value. When the clutch is energized, the motor-generator set starts the engine, and, upon the generation of a predetermined voltage by the main generator, the motor-generator set is disconnected from the line circuit and such circuit is directly connected to the main generator. In case the battery is discharged to a predetermined degree, the electro-magnetic device is operated for energizing the magnetic clutch to shift the load on the line circuit from the motor-generator set to the main generator.

During the operation of the engine, the motor-generator set may be operated to recharge the battery, and, if desired, in case of failure of the clutch or for any other reason, the main generator may be operated as a motor from the motor-generator set to start the engine.

The single figure in the accompanying drawing is a diagrammatic view of a system constructed in accordance with my invention.

Referring to the drawing, an engine 1, having a main generator 2 directly connected to it, is connected to a motor-generator set 3 in any suitable manner, as by means of an electromagnetic clutch 4. The clutch 4 comprises a driving member 5, which is connected to the motor-generator set 3 in any suitable manner, as by means of a shaft 6, and a driven member 7 which is connected to the engine 1 in any suitable manner, as by means of a shaft 8. The motor-generator set 3 comprises a motor 9 and a generator 10.

A line circuit, comprising conductors 11 and 12, is connected either to the generator 10 of the motor-generator set 3 or to the main generator 2 by means of a switch 13. The switch 13 may be of any suitable construction and, preferably, comprises two knife-blade members 14 and 15 which are adapted to engage either the stationary contact members 16 and 17 or the stationary contact members 18 and 19, according to the operation of the main generator 2. A spring member 20 is provided for biasing the knife-blade members 14 and 15 into engagement with the stationary contact members 16 and 17. When the knife-blade members 14 and 15 are in engagement with the stationary contact members 16 and 17, the generator 10 of the motor-generator set is directly connected to the line circuit. An electromagnet 21, which is connected across the terminals of the main generator 2, serves to move the knife-blade members 14 and 15 into engagement with the stationary contact members 18 and 19 upon developing a predetermined voltage by the generator 2. Thus, when a predetermined voltage is produced by the generator 2, the electromagnet 21 is energized and the switch 13 is operated to disconnect the generator 10 from the line circuit and to connect the main generator 2 to such circuit.

A storage battery 22 of any suitable type is provided for operating the motor 9 of the motor-generator set 3. The battery 22 is preferably of relatively low voltage and is connected to the motor 9 by any suitable switch 23. A meter 24, of any standard type, is connected in the circuit between the motor and the battery for indicating the condition of the battery, as to whether or not the same is nearly discharged, and also for operating a contact arm 25 to complete a circuit through a contact member 26 for a purpose to be hereinafter described.

An electromagnetic device 27 is provided for energizing the magnetic clutch in case the load upon the line circuit is raised to a predetermined value and also in case the battery 22 is discharged to a predetermined point. Moreover, the device 27 controls the ignition circuit for the engine 1.

The electromagnetic device 27 comprises two coils 28 and 29 and a contact arm 30 which is controlled by the coils 28 and 29. The contact arm 30 is provided with an interlock switch member 30ª and is biased to a released position by means of a spring member 31. When in the released position, the contact arm 30 bridges a pair of contact members 32, and the interlock switch member 30ª bridges a pair of contact members 33. Upon the bridging of the pairs of contact members 32 and 33 by the contact arm 30 and the interlock switch member 30ª, the electromagnetic clutch 4 is connected across the battery 22, and the ignition circuit for the engine 1 is closed. Any suitable hand-operated switch 34 is provided in the circuit of the clutch 4 for disconnecting it at will from the battery 22.

A relay 35 is provided for controlling the energization of the coil 28 in accordance with the load upon the supply conductors 11 and 12. The energizing coil for the relay 35 is preferably connected in series with the circuit 36 between the switch 13 and the supply conductors 11 and 12. A spring member 50 is provided for biasing the relay 35 to a closed position in order to normally connect the coil 28 across the battery 22. However, in case a load above a predetermined value is carried by the motor-generator set, the relay 35 is operated to de-energize the coil 28.

The coil 29 of the magnetic device 27 is normally connected across the battery 22 by means of the contact arm 25 and the contact member 26. However, if the battery 22 is discharged to a predetermined point, the meter 24 operates to disconnect the contact arm 25 from the contact member 26 and to open the circuit of the coil 29.

When the motor-generator set 3 is in operation to supply current to the supply conductors 11 and 12, the two coils 28 and 29 are simultaneously energized to attract the contact arm 30 and to prevent either the energization of the magnetic clutch 4 or the completion of the ignition circuit of the engine 1. The spring member 31 opposes the action of the two coils 28 and 29 and, in case either of the coils is deenergized, the spring member operates the contact arm and the interlock switch member to bridge the pairs of contact members 32 and 33. Although the two coils 28 and 29 are illustrated on one core armature and as controlling one contact arm, it is to be understood that each of the coils may control a separate relay in the clutch circuit and the ignition circuit if so desired.

A two-pole double-throw switch 37 of any suitable construction, is provided for connecting the terminals of the generator 2 either to the generator 10 or to the switch 13. The switch 37 is provided in order to permit the operation of the main generator 2 as a motor from the generator 10 for starting the engine 1. When the switch 37 is in the one position, the generator 2 may be operated as a motor for starting the engine, and, when in the reverse direction, the generator 2 may be operated to supply current to the line circuit comprising conductors 11 and 12.

During the night-time, when very few lights or translating devices 38 are connected to the line circuit, it is inefficient and inadvisable to operate the engine 1 and the generator 2 for supplying current to such translating devices. Accordingly, the switch 23 is closed and the motor-generator set 3 is operated by the storage battery 22. During such operation, the generator 10 is connected to the line conductors 11 and 12 by the switch 13 and the circuit 36.

If a load above a predetermined value is placed on the line circuit, the relay 35 is operated to open the circuit of the coil 28. Accordingly, the contact arm 30 is retracted by the spring member 31 to complete the energizing circuits of the clutch 4 and the ignition circuit for the engine 1. The electromagnetic clutch 4 is energized from the battery 22 to connect the motor-generator set 3 directly to the engine 1 for starting purposes.

Assuming the switch 37 to be in position to connect the generator 2 to the switch 13, the engine 1 is started by the motor-generator set 3 for supplying energy to the line circuit. When the generator voltage is raised to a predetermined value, the electromagnet 21 operates the switch 13 to disconnect the generator 10 from, and to connect the main generator 2 to, the line circuit conductors 11 and 12. In the above manner, the engine 1 is automatically started and the main generator 2 is connected to the line circuit whenever the load on such circuit becomes too heavy for the generator 10 of the motor-generator set.

If, during the operation of the motor-generator set 3, the battery 22 becomes discharged to a predetermined point, the meter 24 opens the circuit of the coil 29. Upon de-energization of the coil 29, the pairs of contact members 32 and 33 are bridged by the contact arm 30 and the interlock switch member 30ª to start the engine 1, as above set forth. Upon starting of the engine 1, the battery 22 is charged by the dynamo-electric machine 9, operating as a generator. When the battery is charged to a predetermined point, the circuit of the coil 29 is again closed to again operate the magnetic device 27. The ignition circuit is opened by the interlock switch member 30ª, and the circuit of the magnetic clutch 4 is opened by the contact arm 34. Accordingly, the engine 1 is disconnected from the motor-generator set 3 and is stopped. In case the engine 1 has been automatically started by reason of an increased load upon the supply conductors 11 and 12, the engine will be stopped in the manner above set forth and the load placed solely upon the motor-generator set 3 whenever the load falls below a predetermined value. The switch 13, in either case, is operated in accordance with the voltage generated by the generator 2.

If it is desired to start the engine 1 without energizing the electromagnetic clutch, the switch 37 is closed in a position to electrically connect the generator 10 to the main generator 2. In such position of the switch 37, the generator 2 is operated as a motor for starting the engine 1. Upon operation of the engine, the switch 37 is moved to the position for connecting the generator 2 to the switch 13.

Modifications in the system and in the arrangement and location of parts may be made within the spirit and scope of my invention, and such modifications are intended to be covered by the appended claims.

I claim as my invention:—

1. In an electrical system, the combination with a line circuit, a dynamo-electric machine normally connected to said circuit, and an engine having a main generator connected thereto, of means for disconnecting said machine from, and for connecting the main generator to, the line circuit in accordance with the load on such circuit.

2. In an electrical system, the combination with a line circuit, a dynamo-electric machine normally connected to said circuit, means for actuating said dynamo-electric machine, an engine having a main generator connected thereto, and a clutch for connecting said machine to the engine, of means, operative in accordance with the load on the line circuit, for operating said clutch to start the engine by operation of said actuating means and for disconnecting said machine from, and for connecting said main generator to, the line circuit.

3. In an electrical system, the combination with a line circuit, a motor-generator set initially connected to the line circuit, a battery for operating said set, and an engine having a main generator connected thereto, of means, operated in accordance with battery conditions, for starting said engine and for disconnecting said set from, and for connecting the main generator to, the line circuit.

4. In an electrical system, the combination with an engine, a dynamo-electric machine connected thereto and a circuit supplied by said machine, of a battery and translating means operable from said battery to supply said circuit and, under predetermined conditions, to effect the starting of said engine and the charging of said battery.

5. In an electrical system, the combination with a line circuit, a battery of relatively low voltage, translating means operated by said battery to supply a relatively higher voltage current to the line circuit, an engine, and a relatively-high-voltage generator connected to said engine, of means controlled in accordance with battery and line-circuit conditions for starting the engine through said translating means, and means operative upon starting the engine for disconnecting said translating means from, and for connecting the generator to, the line circuit.

6. In an electrical system, the combination with an engine having a main generator connected thereto, a motor-generator set, and a clutch between said engine and the motor-generator set, of a load circuit normally connected to said motor-generator set, and means for operating said clutch to start the engine in accordance with the load on the line circuit.

7. In an electrical system, the combination with a line circuit, a motor-generator set, the generator of said set being normally connected to the line circuit, and an engine having a main generator connected thereto, of means for automatically starting said engine and for transferring the line load from said set to the main generator when the load on the line circuit is raised to a predetermined value.

8. In an electrical system, the combination with an engine, a main generator connected to said engine, a motor-generator set, and a magnetic clutch for connecting said set to the engine, of a source of energy for operating said motor-generator set to start the engine and to supply energy to a line circuit.

9. In an electrical system, the combination with an engine, a motor-generator set, and a clutch between said set and the engine, of a low-voltage source for operating the motor-generator set to supply a relatively high-voltage current to a line circuit, and means for automatically operating the clutch to connect said set to the engine for starting purposes, when the load on the line circuit is raised to a predetermined value.

10. In an electrical system, the combination with an engine having a main generator connected thereto, a motor-generator set, and a clutch between said set and the engine, of a battery for operating said set, under certain load conditions, to supply current to a line circuit, means, operative under other load conditions, for operating said clutch to start the engine by said set.

11. In an electrical system, the combination with an engine having a main generator connected thereto, an auxiliary dynamo-electric machine, and a clutch between said machine and the engine, of means for operating said machine to supply current to a line circuit under certain load conditions, and under other load conditions, for automatically effecting the connection of said clutch to start the engine.

12. In an electrical system, the combination with an engine having a main generator connected thereto, said generator producing a relatively high voltage, a motor-generator set, the generator of said set being adapted to produce a relatively high voltage, and a clutch between said set and the engine, of a battery of relatively low voltage for operating said set, under certain load conditions, to supply current to a line circuit, means, operative under certain battery conditions and under certain load conditions, for operating said clutch to connect said set with the engine, and means, operable upon starting of the engine, for disconnecting the generator of said set from the line circuit and for connecting the main generator to such circuit.

In testimony whereof, I have hereunto subscribed my name this 11th day of May, 1920.

THOMAS J. McGILL.